June 2, 1964  R. J. THOMPSON ETAL  3,135,573
DATA GATHERING, TRANSMITTING AND RECORDING SYSTEM
Filed April 17, 1961  4 Sheets-Sheet 1

INVENTORS
RALPH J. THOMPSON
& CLEMENT T. LOSHING
BY Williams, Tilbury & Solrick
ATTORNEYS June 2, 1964  R. J. THOMPSON ETAL  3,135,573
DATA GATHERING, TRANSMITTING AND RECORDING SYSTEM
Filed April 17, 1961  4 Sheets-Sheet 2

INVENTORS
RALPH J. THOMPSON &
CLEMENT T. LOSHING
BY

ATTORNEYS

FIG. 3
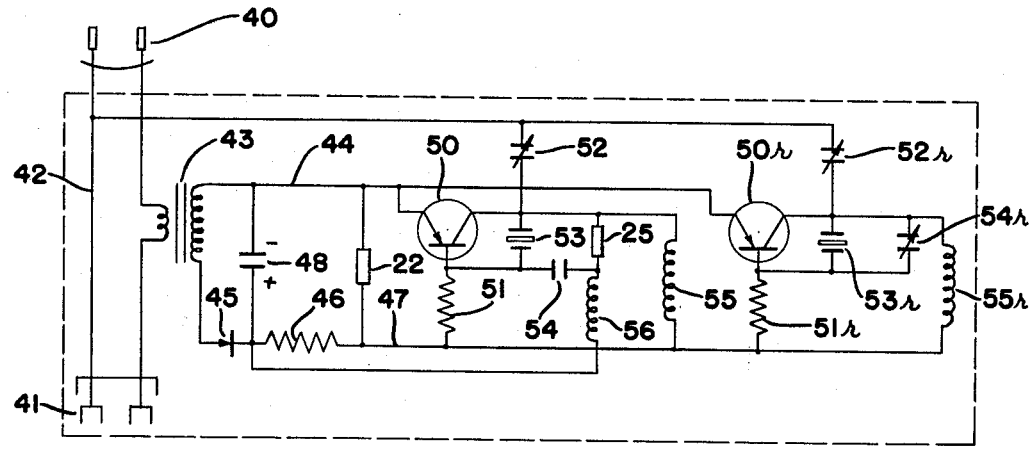
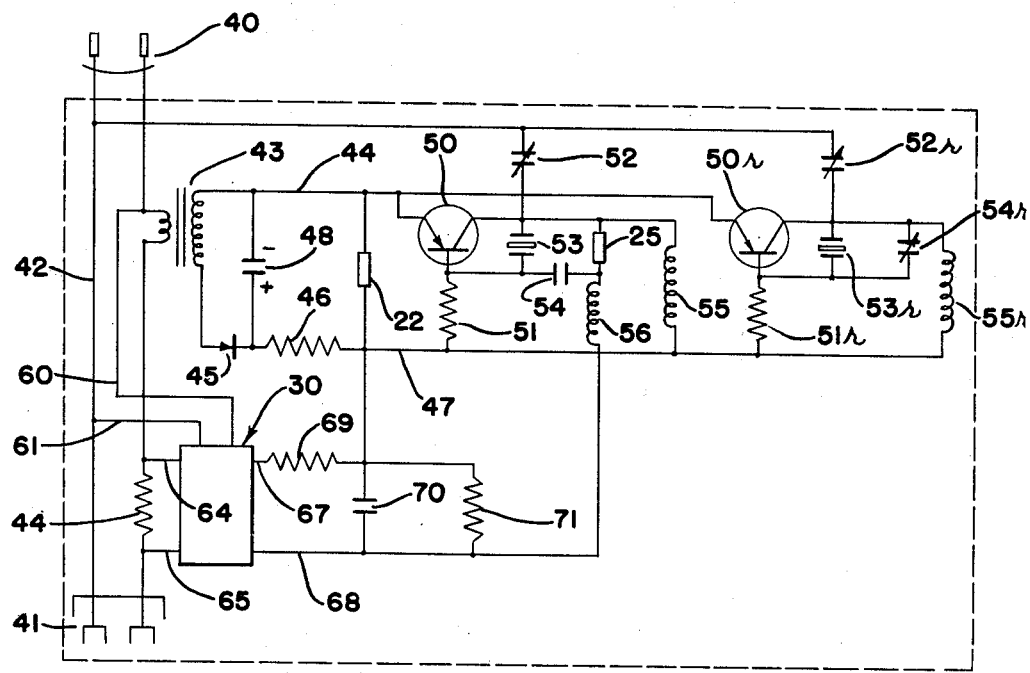
FIG. 4

INVENTORS
RALPH J. THOMPSON &
CLEMENT T. LOSHING
BY Williams, Tilberry & Gohrick
ATTORNEYS

United States Patent Office 3,135,573
Patented June 2, 1964

3,135,573
DATA GATHERING, TRANSMITTING AND
RECORDING SYSTEM
Ralph J. Thompson and Clement T. Loshing, both of
P.O. Box 5000, Cleveland 1, Ohio
Filed Apr. 17, 1961, Ser. No. 103,309
9 Claims. (Cl. 346—1)

The present invention is concerned generally with a data gathering, transmitting and recording system. More especially it is concerned with such a system, method and means, in which at one or more stations there is monitored a respective variable in an event which may there occur, with the variable being sensed and applied in a transmitter to provide a transmitter signal varying in frequency from a respective distinct base frequency. Each such signal is received at a central recording station and transformed into a signal representative of the variable monitored and adapted for recording on a medium such as magnetic tape where several longitudinal channels of information may be imposed.

Particularly the present invention is concerned with a system for sensing at each station an event involving a variable, which event brings into operation a transmitter producing a signal in frequency varying proportionately to the variable and sent by low level electro-magnetic radiation or by carrier current transmission to a relatively remote receiving and recording point. The invention is disclosed in the specific form of a carrier current system adapted for electric utility load studies, wherein it is desired to record on a medium suitable for processing in modern computing machines, data respecting load demands continually over successive periods throughout household, manufacturing establishment, or other premises of a utility consumer. Transmitter circuitry is disclosed adapted to incorporation in small, inconspicuous rugged units. The units may be of a size permitting them to assume a form plugged or screwed into a receptacle or socket and in turn receiving the power cord plug, or a load device itself such as a lamp bulb; or a form readily installed even in existing switch boxes, fixtures or receptacles.

At the recording station, receiver means for each transmitter provides an audio range output signal upon operation of a respective transmitter, which output either directly, or after modification as by pulse-shaping or frequency dividing means, is applied through a corresponding recorder head section to a medium such as magnetic tape. The frequency variation of the recorded signal, being at least of known proportion to the transmitter frequency variation, is then a continuous record of the actual instantaneous load at the transmitter. Moreover, with locally generated time pulses applied in a time channel on the tape, the record produced is especially useful for data processing by a data translating system such as that of our U.S. Patent 2,960,266.

The invention is of course useful in other fields beyond that here specifically disclosed. Thus where a device comes into operation effecting a voltage change which is linearly related to a variable in the event to be monitored or observed, a transmitter is brought into operation, and by the present invention an output signal of the transmitter is varied from its specific base frequency proportional to the voltage, and hence the variable. Alternatively, if the occurrence of an event at a transmitting monitor station produces an energy effect, the effect can be sensed through an appropriate transducer providing an output voltage effective to vary the frequency of a transmitter signal, the variation in frequency being proportional to a rate involved in the observed event.

A system and means for obtaining the above-described objects and advantages are set forth in the following description and drawings, representing the invention as applied to electric utility load studies, wherein:

FIGS. 3 and 4 are schematic diagrams of circuitry which may be used, especially where miniaturization is desired, respectively for transmitters as shown in the detailed block diagrams of Xa and X in FIGS. 1 and 2;

Figure 1:
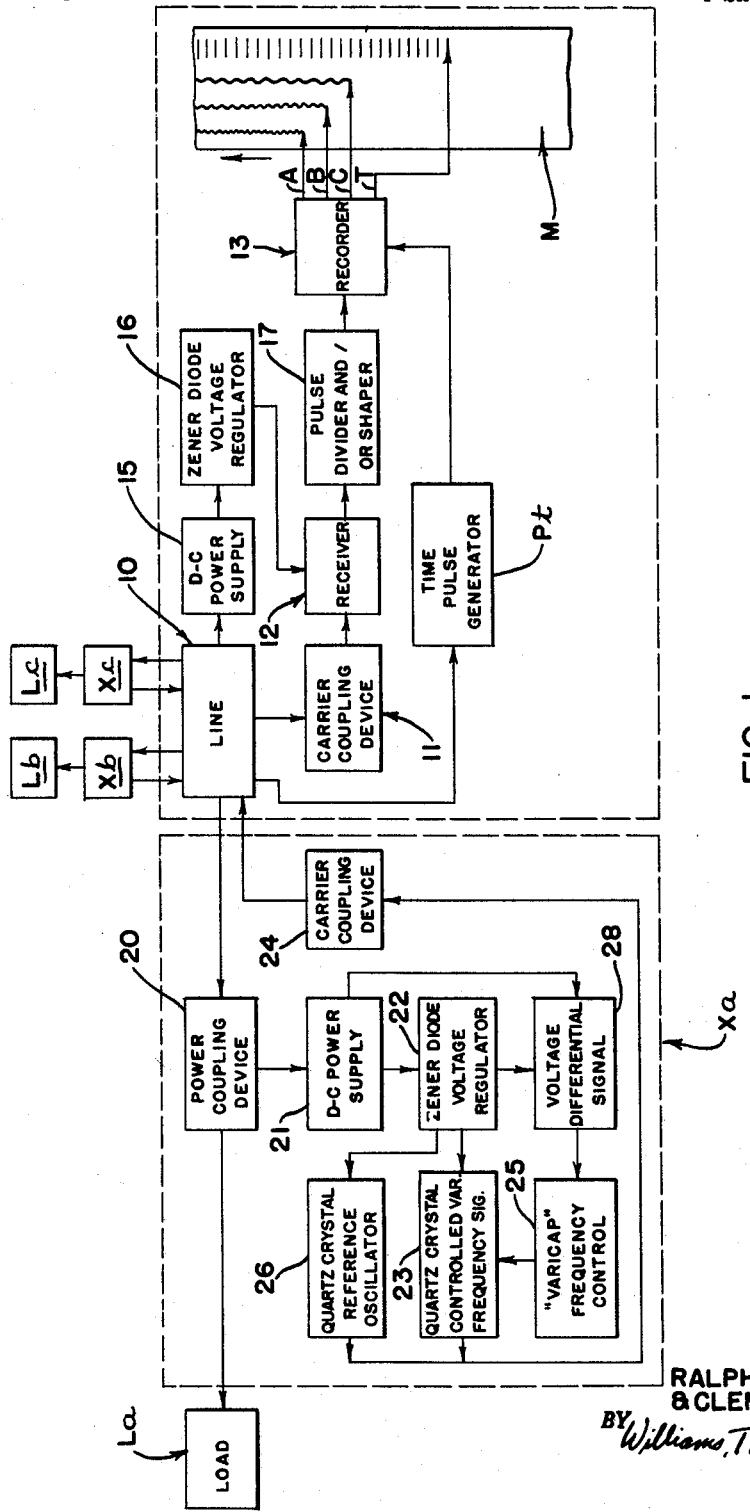
FIG. 1 is a block diagram for one embodiment of the system invention including a detailed block sub-diagram Xa for a "volt-ampere" type transmitter which may be used for one or more measured loads.

In FIG. 1 there is represented by a block diagram one embodiment of the system invention, wherein a plurality of loads La, Lb and Lc, on a line 10 of a local or general electrical power distribution system, by respective operation actuate corresponding transmitters Xa, Xb, Xc to generate signals here coupled to and by carrier current transmitted through the line 10 to a common receiving and recording point; at which point the signals are coupled through coupling device 11 to receiving means 12 the output of which is fed to recorder means 13 as later described for applying to a record medium, such as a magnetic tape M, in respective parallel channels, A, B, C, a load record for each transmitter. Preferably, there is also applied to the record medium in a time channel T time pulses locally generated at a constant time rate by time pulse generating means Pt. The transmitters, upon operation of their respective loads, each generate variable frequency signals, having distinct non-interfering base frequencies, representative in frequency variation of the loads as metered.

Figure 2:
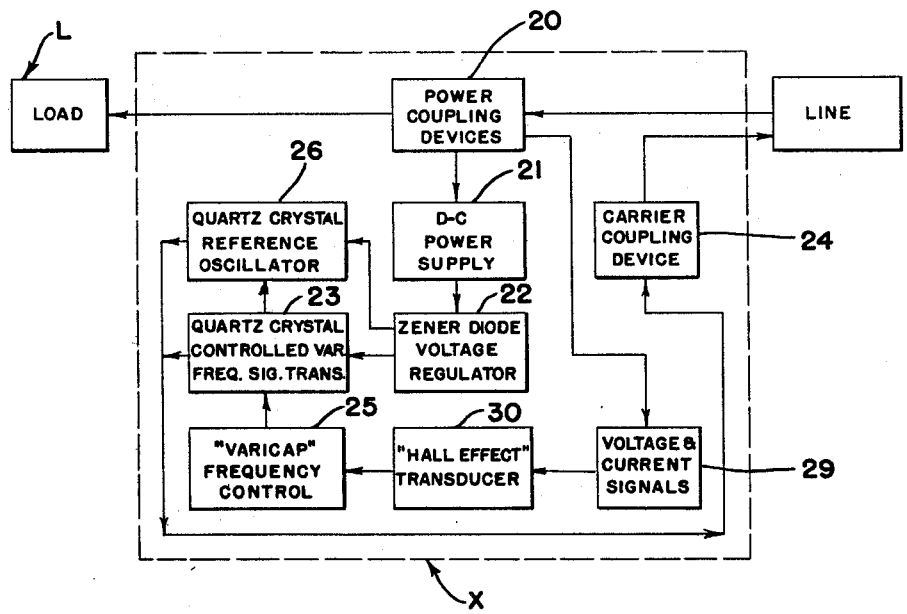
FIG. 2 is a block diagram for an "actual or true power" type transmitter which may be used for one or more measured loads.

The transmitters in the disclosed system, individually considered may be either of the "volt-ampere" type (of which a specific embodiment is disclosed in Xa of FIG. 1 and in more detailed and specific form in FIG. 3) or of the "actual" or "true" power type (of which a specific embodiment is disclosed in X of FIG. 2 and in more detailed and specific form in FIG. 4). Either form of transmitter generates a signal of variable frequency, with the variation in frequency a function of some variable characteristic of the load. The frequency variation, for example, may be a function of I or I cos θ; that is, with the line voltage being taken as constant, apparent or true power respectively. For any load the type of transmitter is selected as may be required for the desired character, degree, or precision of measurement.

Thus Xa, Xb, Xc may transmit with respective base frequencies of 5,000,000, 5,300,000 and 5,800,000 c.p.s., signals instantaneously varying from the individual base by a frequency difference which is a function of the load at each.

At the recording end of the system represented in FIG. 1, there is further shown a D.C. power supply means 15 and Zener diode type voltage regulator means 16 for energizing the receiver means from line 10; and pulse dividing and/or shaping means 17 between the receiver means 12 and recorder means 13. The receiver means 12 includes for each load signal transmitter either a separate receiver network or channel circuit in a single receiver providing a distinct output corresponding to each transmitter, or a separate receiver unit providing a separate receiving channel. In either case, if required or advantageous in a particular situation, the pulse dividing and/or shaping means 17 may provide for one or more output channels of the receiver means a corresponding pulse shaping and/or dividing circuit for applying to the recording medium M through a respective head section of the recorder means 13 a respective trace or record. Such a pulse dividing circuit is of utility for any channel where an acceptable tape speed would result in an undesirably high linear rate of recorded pulses.

In the overall form of the system as here disclosed, it is contemplated that each load will be connected to the supply line 10 by power coupling means 20 associated with a respective transmitter or incorporated in a physical unit embodying the transmitter, the means 20 then providing power conduction to the load and also providing power for energizing the transmitter as through D.C. power supply means 21 and the preferably included Zener diode type voltage regulator 22 to a crystal controlled variable frequency oscillator 23, the output of which is fed through a suitable carrier coupling device 24 into the line.

The frequency variation of the oscillator is accomplished through the separately represented oscillator frequency control means 25 such as the solid state device currently known under the trademark "Varicap," for which the instantaneous capacity as an output is determined by and proportional to an applied or input voltage. The load is then sensed through the power coupling means 20 and a corresponding voltage is developed for application to the "Varicap" frequency control means 25, as hereinafter detailed. Either the current drawn by the load is reflected through the D.C. voltage supply 21 and an associated voltage differential signal producing means 28 (see FIGS. 1 and 3); or through power coupling means 20 and voltage and current signal producing means 29, and a transducer means 30 such as a "Halltron" type transducer circuit (see FIGS. 2 and 4).

In either case, as a load comes on the line, the respective transmitter is energized to come into operation; and as the load varies, developing a voltage change applied as an "input" to the "Varicap," the corresponding variation of the transmitter frequency determining capacitance produces a frequency variation proportional to the selected load characteristic variation.

A crystal controlled reference oscillator 26 advantageously is used in the system at either the receiver or transmitter points to cancel the effect of ambient conditions such as temperature, preferably as shown in the drawings at each transmitter point, where it is also energized by the D.C. power supply through the voltage regulator 22.

With the disclosed system variable frequency signals transmitted over a common medium, here by carrier current transmission through the line, and received by the receiver means 12, produce in respective receiver channels audio range variable frequency outputs which are at least individually proportional to the respective metered load characteristics. The audio range outputs of a given receiver means channel may, for particular circumstances of a specific recorder and desired speed of the recording medium, such as a tape, require pulse shaping and/or output pulse frequency division. Suitable means for division are now well known, for example the "Type 502 Solid Circuit Network" of Texas Instruments, Incorporated, connected as a binary counter, a miniaturized component having a stated 200 kc. upper limit (e.g. see "Electronics" July 29, 1960 issue); or a magnetic core frequency divider, as described in Electronics, April 11, 1958 issue; or a tunnel diode frequency divider, as described in data sheets of Hoffman Electronics Corporation, Semiconductor Division; or, e.g. Sprague Type 73Z1 Core-Transistor Diode Counters, cascaded if needed.

Conceivably as said receiving means, a quite wide band receiver unit might be used to receive and amplify all transmitted signals as a composite output (with or without conversion into lower frequency) having components each with a frequency variation proportion to a metered load characteristic and with the composite output then being applied to a filter of said receiver means including separate channels each adapted to pass a band of the receiver unit output corresponding to a particular transmitter, and with a beat frequency oscillator signal for each filter section output mixed therewith to provide (through pulse shaping and/or dividing means) a final signal to a recording head section proportional in frequency to the metered load characteristic.

However, for ultimate simplicity or convenience of design, it is often preferable to use at the central receiving station individual receiver units for each channel, i.e. for each transmitter, which are coupled to line and tuned to the frequency range of respective transmitters to apply (through pulse shaping and/or divider units where used) to the recorder, individual outputs in the audio range proportional to the metered load characteristics.

The latter arrangement is hereinafter described wherein the receiver means 12 includes for each transmitter the general arrangement of FIG. 5.

In any event with a system as thus far generally detailed, there is producible on one medium a multi-channel recording of monitored events or metered variable such as individual loads of electric energy consuming devices, with a time channel record of time pulses generated at pre-set rate, whereby the records in the several channels may be related to time of occurrence with the actual time of the beginning or end of the record known; or interpreted as functions of time such as instantaneous time rates; or in effect integrated over selected periods, as contemplated in our Patent 2,960,266. From the known characteristics of each transmitter and the known frequency division ratio, appropriate meter constants are available for each record channel upon processing the data there recorded. The presence of the time channel in the record is especially advantageous for such purposes, inasmuch as it provides a means for rendering the playback interpretation of recorded data independent of differences in recording and playback tape speeds.

Considering now in further detail suitable transmitter devices for the general system, FIG. 3 presents in schematic form circuitry adapted for a miniaturized, compact, inconspicuous and rugged device, which transmits upon operation of a load a signal having a frequency variation which is proportional to an instantaneous "volt-ampere" demand of the load; it being contemplated that the device will assume the form say of a plug-in unit having a casing with a plug 40 and socket 41 respectively adapted to be inserted into a receptacle or outlet of an electrical A.C. power distribution system and to receive the plug of an electrical device forming an applicable load on the power system.

For coupling of the load to the power system, the source of electrical energy, the said plug and socket are connected on one side by the conductor 42; and on the other through the relatively low impedance, here shown as the primary of a transformer 43, in view of the prevalence of A.C. power, although a low value resistance could be used (for a D.C. line) across which a voltage drop is utilized to provide the power coupling and D.C. supply. The transformer 43 provides power coupling from the line for energizing the transmitter, so that the specific circuitry thus far described is represented by the power coupling device block 20 of FIG. 1. The D.C. power supply represented by block 21 of FIG. 1 includes the negative conductor 44 connected to one side of the transformer secondary; the secondary in series with the rectifier diode 45 and the resistor 46 to positive conductor 47; and the filter or D.C. smoothing capacitor 48 connected from 44 to a point between 45 and 46; while the voltage regulator 22 of FIG. 1 appears as the Zener diode 22 connected between 44 and 47.

For producing a signal of varying frequency there is provided the transistorized oscillator circuit comprising a transistor 50 having emitter connected to the negative side 44 of the power supply and base connected to the positive side through bias resistor 51; and a frequency determining tank network, coupled from the collector through variable capacitor 52 (as the line coupling device 24 of FIG. 1) to conductor 42. The tank circuit includes the crystal 53, e.g., a quartz crystal, between the collector and base; and a solid state device 25 (such as a "Varicap," as described for FIG. 1) and a blocking capacitor 54 in series between base and collector (i.e., in parallel with 53). The positive side of the voltage supply is applied through RF choke 55 to the crystal. To the device 25 there is applied through the RF choke coil 56 as hereinafter described a potential causing a variation in the capacity of the solid state device 25 and therefore of the oscillator frequency. The chokes 55, 56 serve respectively to apply D.C. voltage to crystal 53 and device 25 while choking any RF leakage back into the power supply, and also through 55 to apply transistor operating voltage.

A reference oscillator, for the individual transmitter, which may be either at the individual receiver unit or at the transmitter, is here shown (as at block 26, FIG. 1) in preferred location at the transmitter, with a configuration analogous to that of the variable frequency oscillator and similarly connected as appears in the drawing to the power supply leads 44, 47 and coupled through adjustable capacitor 52r to the line. In the reference oscillator circuit the analogous components, designated by like reference numerals with suffixed "r," are transistor 50r, quartz crystal 53r, choke 55r, resistor 51r and vernier adjustable capacitor 54r, the latter actually being operatively set (within small limits) to correspond to the desired base frequency of the variable frequency oscillator circuit, analogous to the net capacitance of 54 and 25 at zero load condition, and permit adjustment for slight deviation of the fundamental crystal frequency.

At this point should be noted the similarity of FIG. 4 circuitry to that thus far described for FIG. 3, for which reason like reference numerals are used for analogous components. The Zener diode 22 in FIG. 4 operates essentially only as a voltage regulator for the power supply of the oscillators.

In FIG. 3 the point between diode 45 and resistor 46 is connected through RF choke coil 56 to one end of device 25, to use 46 in conjunction with the secondary of transformer 43 as the differential signal generating means 28 of FIG. 1; and the Zener diode has a further function of holding the voltage drop variation (therefore the potential variation effective on device 25) only to that occurring across resistor 46. In FIG. 3 the variation of instantaneous load current through the primary of transformer 43, reflected in the secondary, is effective to produce across resistor 46 (as the means 28, FIG. 1, for developing the voltage differential signal) a variable potential drop applied across device 25 for varying its capacitance and therefore the frequency of the oscillator signal. The transformer 43 for FIG. 3 or 4 is designed for the lowest load which will produce the rated Zener diode voltage.

In FIG. 4, the coupling of the load to the power line on the one side involves the series connected primary of transformer 43, and the current input branch to "Halltron" device 30, that is, the "shunt" resistor 44. The Hall-effect transducer 30, may, for example, be one such as that described in a prior publication of Ohio Semiconductors, Inc. for the therein denominated "Halltron HS–51" solid state device, among other applications shown for an instantaneous power meter. For such application (as means 29, FIG. 1, for producing voltage and current signals) preferably the line side of the said transformer primary and the conductor 42 are connected to a magnetic input of the transducer, as by leads 60, 61, that is, to an electromagnetic field producing component, which provides a field intensity substantially proportionate to the voltage applied to the load; and the current input to the load through conductor 42, ultimately returning from the load on the other side of socket 41 through resistor 44 shunting the transducer current input is applied at leads 64, 65 to the transducer for producing a transducer output across 67, 68.

The net effect is that the output of the transducer is applied through RF choke coil 56 to the device 25 over the signal averaging network (between coil 56 and positive supply lead 47) comprising resistor 69 connected to positive supply lead 47, and the capacitor 70 and resistor 71 connected in parallel between 47 and the output lead 68 to 56.

The circuitry here described then results in a frequency variation (due to potential applied across device 25) which is a linear function of the voltage output of the averaging network, in turn proportional to the "actual" or "true" power demand.

Figure 5:
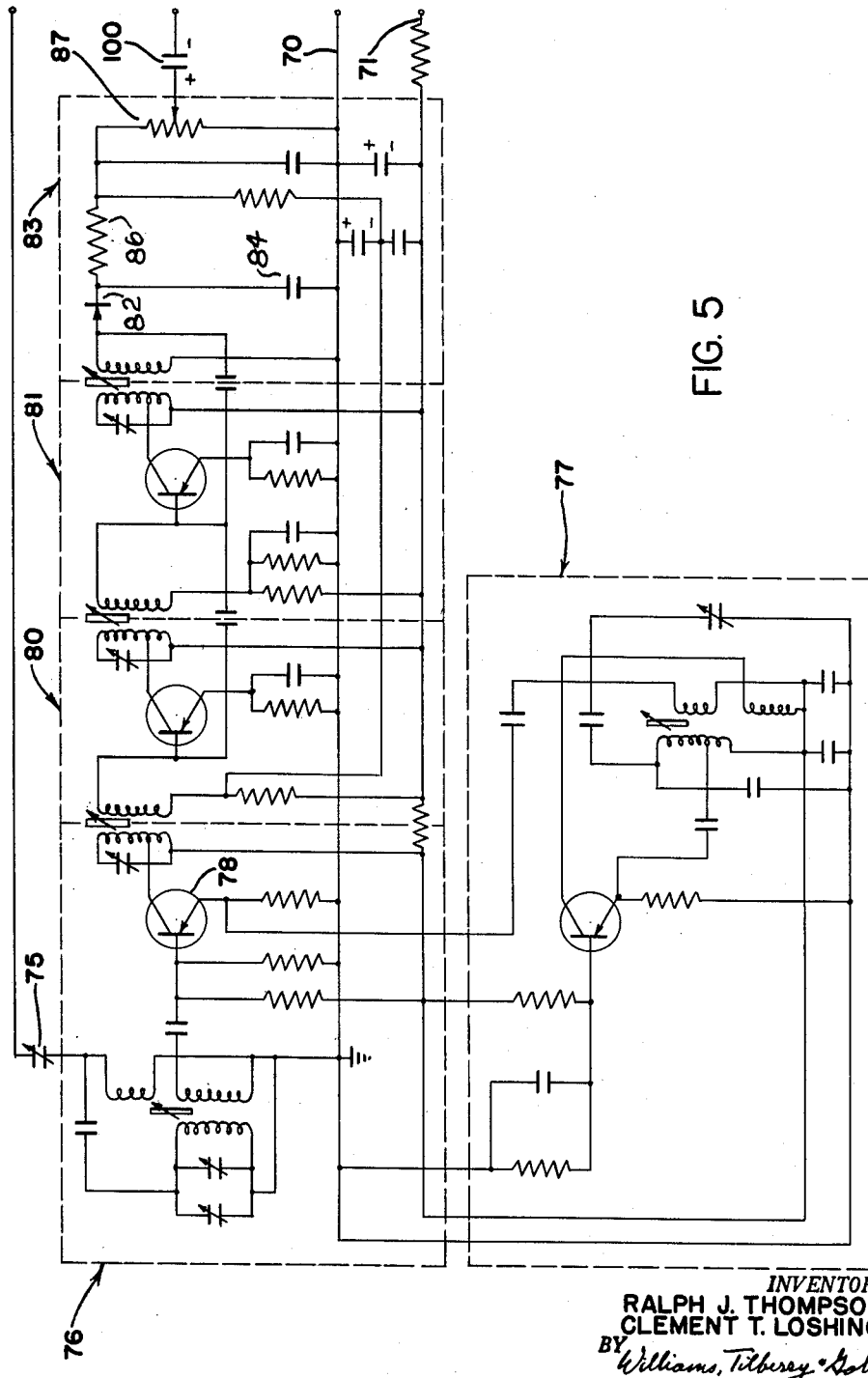
FIG. 5 is a schematic diagram for a receiver suitable for the system and adapted to compact or miniaturized construction.

Returning then to the receiver station, FIG. 5 presents circuitry for separate receivers for each transmitter, thereby providing distinct channels from the line adapted to provide outputs to respective recording head sections for record channels A, B, C, etc. through corresponding sections of or through distinct dividing and/or pulse shaping means 17 as previously described. FIG. 5 actually shows the adjustable capacitance 75 (as the coupling device 11, in FIG. 1) feeding signals from the line into a completely transistorized receiver unit (as a part of means 12 of FIG. 1), the receiver unit being energized form a common D.C. supply indicated by leads 70, 71.

The band tuned input mixer section 76 including transistor 78 passes the signal of a corresponding transmitter for mixing with the output of a beat frequency oscillator section 77 to produce a lower frequency range signal applied through two transistorized IF amplifier stages 80, 81 to the detector diode section 83 including diode 82. The output of diode 82 (by-passed for the IF base frequency through capacitor 84 to lead 70) is developed across fixed resistor 86 and the winding of output level adjusting potentiometer 87 in series between diode 82 and the positive power supply lead 70. The receiver output is coupled through the arm of potentiometer 87 and coupling or D.C. isolation capacitor 100 to the subsequent pulse-shaping and/or dividing means as described for 17.

By way of example, where the unit of FIG. 5 corresponds to a transmitter having a 5 mc. base frequency, the input circuit of the mixer section is tuned to pass a band range of 5 mc. plus the maximum frequency variation to be expected at the transmitter; and with the BFO section 77 having a 4.6 mc. output to the mixer there results an amplified output of IF stages 76, 77 having an actual frequency varied from an intermediate base frequency of 0.4 mc. by the variation in the corresponding transmitter signal. This output applied through detector diode stage 83 and associated circuitry where the 0.4 mc. base component is by-passed results in an amplified output across the resistor of output level adjusting potentiometer 87 having an audio frequency corresponding to the frequency variation developed at the corresponding transmitter. Pulse shaping actually begins at diode 82.

Although it is perhaps obvious, it is remarked that the undulate traces appearing in the tape load recording channels are merely visual symbols of pulse records invisible in the case of magnetic tape, nor do such symbolic traces necessarily represent even graphically the final pulse shapes as magnetically recorded.

We claim:

1. A method for recording at one central point data respecting events occurring at a plurality of stations monitored for the occurrence of said events, comprising: monitoring each said station for the occurrence of the respective event; generating at each said station upon occurrence of the event there monitored a signal varied in frequency from a base frequency distinct for each said station and transmitting each said signal to a central receiving point; the generation of each said signal being initiated by and enduring for as long as the event monitored at the generating station, and the frequency variation of each said signal being instantaneously proportional to a rate involved in the respective monitored event; receiving all said transmitted signals at said point and transforming each to a receiver output of audio frequency proportional to a respective event rate; and applying each audio output to a respective channel of a recording medium.

2. A method as set forth in claim 1, wherein there is applied to a distinct channel of said recording medium a series of time impulses generated at temporally equi-spaced intervals.

3. In a method as set forth in claim 2, monitoring at at least one of said stations a respective event involving a function variable with respect to a linear function of time.

4. A system for recording at one central point data respecting events occurring at a plurality of stations monitored for the occurrence of said events, said data being related to a rate involved in said event; comprising: at each station, a transmitter actuated upon occurrence of the observed event for transmission of a signal of a distinct base frequency identified with its station and varied in frequency from the base at a rate corresponding to a rate involved in the monitored event; recording means at said one central point including a multi-channel recording head and means for transport of a recording medium by said head for recording on said medium data related to each said transmitter in a corresponding channel of said medium; multi-channel receiving means at the recording point for receiving signals from said transmitters and supplying to each channel of the recording head an audio-frequency output having a frequency proportional to the frequency variation of a respective transmitter.

5. A system as described in claim 4 including carrier current transmission means for propagation of said signals from transmitters to said receiver.

6. A system as described in claim 5, adapted for electric utility load studies in a part of the utility distribution system delimited by common electrical supply line, wherein each monitored load is connected to the common electrical supply line through a device including a one said transmitter responsive to operation of the load to transmit into said line a signal having a frequency varying in proportion to the load.

7. A system as described in claim 6, wherein at least one of said transmitters comprises an oscillator feeding a respective said signal as an output into said utility line, said oscillator including a solid state device of variable capacitance for varying the transmitter output frequency, said device responsive in capacitance variation to a voltage variation applied as an input thereto, means for applying an input to said device and including a resistance for developing thereacross a voltage variation proportional to a variable in said load, and power coupling means adapted to energize the oscillator interposed between said line and a respective load.

8. A system as described in claim 7 wherein said one transmitter includes a transformer having a primary in series with said load and a secondary in series with said resistance as components of said power coupling means energizing said oscillator.

9. A system as described in claim 7, wherein the means for applying an input to said device includes a second solid state device responsive both to the instantaneous current drawn by said load and the instantaneous voltage applied to said load to provide as its output a voltage varying with the true power of said load.

References Cited in the file of this patent
UNITED STATES PATENTS

| | | |
|---|---|---|
| 2,643,172 | Reiss | June 23, 1953 |
| 2,774,941 | Kennedy | Dec. 18, 1956 |
| 2,788,254 | Nilsson | Apr. 9, 1957 |
| 2,837,648 | Gabor | June 3, 1958 |
| 2,936,428 | Schweitzer | May 10, 1960 |
| 3,021,492 | Kaufman | Feb. 13, 1962 |